(12) United States Patent
Weller et al.

(10) Patent No.: US 7,417,949 B2
(45) Date of Patent: Aug. 26, 2008

(54) CLOSED LOOP METHOD AND APPARATUS FOR THROTTLING THE TRANSMIT RATE OF AN ETHERNET MEDIA ACCESS CONTROLLER

(75) Inventors: Bruce Weller, San Jose, CA (US); Scott Simon, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 603 days.

(21) Appl. No.: 10/993,265

(22) Filed: Nov. 19, 2004

(65) Prior Publication Data

US 2006/0109784 A1    May 25, 2006

(51) Int. Cl.
 *G01R 31/08* (2006.01)
(52) U.S. Cl. .................................... 370/229; 370/468
(58) Field of Classification Search ........................ None
 See application file for complete search history.

(56) References Cited

U.S. PATENT DOCUMENTS

| | | | | |
|---|---|---|---|---|
| 6,108,713 A * | 8/2000 | Sambamurthy et al. | ..... | 370/463 |
| 6,393,489 B1 * | 5/2002 | Sambamurthy et al. | ..... | 709/250 |
| 7,072,360 B2 * | 7/2006 | Dravida et al. | ............... | 370/468 |
| 7,142,553 B1 * | 11/2006 | Ojard et al. | .................. | 370/421 |
| 2003/0126233 A1 * | 7/2003 | Bryers et al. | ................. | 709/219 |
| 2004/0001435 A1 * | 1/2004 | Wong | .......................... | 370/230 |
| 2005/0005189 A1 * | 1/2005 | Khermosh et al. | ............. | 714/4 |

OTHER PUBLICATIONS

Broadcom Corporation, *BCM6335 Product Brief: Single-Chip ADSL-To-Ethernet CPE Router*, 6335-PB00-R Nov. 5, 2006, copyright 2003 by Broadcom Corporation, Irvine, California, available on the Internet at: <http://ko.broadcom.com/collateral/pb/6335-PB00-R.pdf>.

* cited by examiner

*Primary Examiner*—Melvin Marcelo
*Assistant Examiner*—Phuongchau B Nguyen
(74) *Attorney, Agent, or Firm*—Charles E. Krueger

(57) ABSTRACT

A system and method for MAC-PHY rate matching combines carrier sense signal and rate matching techniques to implement close loop rate matching. An adapter entity responds to each carrier sense deferral to throttle the MAC until rate matching is achieved.

6 Claims, 3 Drawing Sheets

CLOSED LOOP METHOD AND APPARATUS FOR THROTTLING THE TRANSMIT RATE OF AN ETHERNET MEDIA ACCESS CONTROLLER

BACKGROUND OF THE INVENTION

Many networking devices adhere to the IEEE802.3 standard as their layer 1 and 2 interface. The layer 2 entity is known as the MAC (Medium Access Controller) and the layer 1 entity is known as the PHY (PHYsical layer). IEEE802.3 defines an interface between the MAC and the PHY, known as the MII (Medium Independent Interface).

FIG. 1 depicts the layered model of Ethernet that includes a Media MAC layer and a PHY layer. The MAC layer is responsible for, among other things, controlling access to the media and the PHY layer is responsible for transmitting bits of information across the media. In Ethernet, the interface between the MAC and the PHY is specified by IEEE 802.3 and has evolved from the 10 pin MII for 10/100 Ethernet, to the 20 pin GMII (Gigabit Media Independent Interface) for GE (Gigabit Ethernet), to the 36 pin XGMII (10 Gigabit Media Independent Interface) for 10 GE.

Thus, in a typical implementation, the MII operates at a speed of 100 or 10 mbps (MegaBits Per Second). The MAC sends Ethernet frames to the PHY at this rate and the PHY then sends the frame out on the medium. Typical PHYs operate at the same rate as the MAC/MII.

Certain newer implementations couple the MAC/MII with a PHY that is incapable of operating at the full rate. One example is an Ethernet-over-DSL (Digital Subscriber Line) PHY that might transmit at 15 mbps. Since the MAC and MII operate at a fixed rate (either 10 or 100 mbps in this case), a method must be used to throttle the MAC so that it does not overload the PHY.

This throttling is also known as "MAC-PHY rate matching". There are four existing methods for MAC-PHY rate matching.

The first two methods depend on signals generated to indicate carrier sensing and collision detection. As is known in the art, Ethernet utilizes a shared medium protocol know as CSMA/CD (Carrier Sense Multiple Access with Collision Detection). Each node connected to the medium may transmit a message as long as no other message is currently being transmitted on the medium. Thus, each node listens to the medium prior to transmitting, for example by monitoring the current flow in a wire, to see if a carrier (signal) is being transmitted by another node. If a carrier is detected the PHY asserts a carrier detect signal that causes the MAC to delay transmission of a frame.

Additionally, it is possible for collisions to occur because one node may start to transmit after another node has transmitted but before the carrier is detected due to the delay of the propagation of the carrier. A node monitors its own transmission to detect a collision, for example by detecting a higher current than due to its own transmission. If a collision is detected then the PHY asserts a collision detect signal that causes the MAC to abort the transmission of the frame (collision back off).

The first MAC-PHY rate matching technique uses "collision back off". As described above, collision back off is a feature of Ethernet in which the PHY signals to the MAC if another device on the network begins to transmit at the same time as the PHY. (The two transmitters thus "collide".) In this case, the PHY signals to the MAC that a collision has occurred and the MAC ceases transmission, waits a random interval and tries to transmit again.

When used for rate matching, the PHY signals a collision when its buffers are full and the MAC tries to transmit another frame. In this case, the MAC will back off and try again. If the buffers have room, the PHY will accept the frame. Otherwise it will again signal collision.

The second method for rate matching uses an Ethernet feature called "carrier sense deferral". In an Ethernet network, as described above, the PHY asserts a carrier sense signal to inform the MAC when another device on the network is transmitting. This assertion of the carrier sense signal is called a "deferral". To prevent collisions, MAC will not transmit while the PHY is asserting carrier sense.

The PHY can assert the carrier sense signal when its transmit buffers are full to prevent the MAC from transmitting any more frames. Thus, carrier sense deferral may be used for rate matching. This method is described in IEEE802.3ah "Ethernet in the First Mile" standard.

The third method for rate matching uses MAC "Pause frames". A "Pause frame" is a special Ethernet frame that, when received, instructs a MAC to stop transmitting. After a certain period, the MAC then resumes transmission. Pause frames are usually sent from remote network devices to the MAC.

In the case of rate matching, the PHY inserts a Pause frame in the received data stream which in turn instructs the MAC to stop transmitting. The PHY sends the pause frame when its transmit buffer is filled to a defined level. The buffer needs to be large enough to accept any frames that the MAC may transmit while receiving and processing the Pause frame. Using Pause frames allows the MAC and PHY to transmit and receive data at the same time, an improvement over using the collision signal for rate matching.

The fourth method of rate matching is known as "traffic shaping". Typically, a MAC with data to transmit will use an IPG (Inter-Packet Gap) of 0.96 microseconds (for 100 mbps operation) between each frame. If the MAC has knowledge in advance of a desired traffic rate (the "target rate"), a traffic shaper on the MAC can increase the length of the IPG accordingly, thus reducing the rate at which frames are sent to the PHY equal to the target traffic rate. The PHY still needs a buffer to store each frame because the frames traverse the MII at 100 mbps, but in this case the MAC can wait for the buffer to be nearly empty before sending the next frame. Traffic shaping is currently employed on many Ethernet switches as a way to manage congestion on network links.

As will be described more fully below, each of these techniques has drawbacks and a need exists for an improved technique for MAC-PHY rate matching.

BRIEF SUMMARY OF THE INVENTION

In one embodiment of the invention, a closed loop traffic shaping system adjusts the IPG between frames or packets transmitted by the MAC in accordance with the traffic rate of the PHY.

In another embodiment of the invention, the PHY asserts a carrier sense signal to indicate that data is being received at a higher rate than it is being transmitted. The MAC responds to the carrier sense signal to decrease the rate that data is transmitted to the PHY.

In another embodiment of the invention, an adaptor entity adjusts the target rate of a traffic shaper. The adaptor decreases the target rate incrementally upon each deferral until deferrals are no longer occurring.

In another embodiment of the invention, the adaptor entity periodically, or on command, increases the traffic shaper's target rate to test whether the traffic rate of PHY has increased. The adaptor increases the target rate until deferrals begin again and then decreases the rate until the target rate and the traffic rate of the PHY are matched.

Other features and advantages of the invention will be apparent in view of the following detailed description and appended drawings.

DETAILED DESCRIPTION OF THE INVENTION

Figure 1:
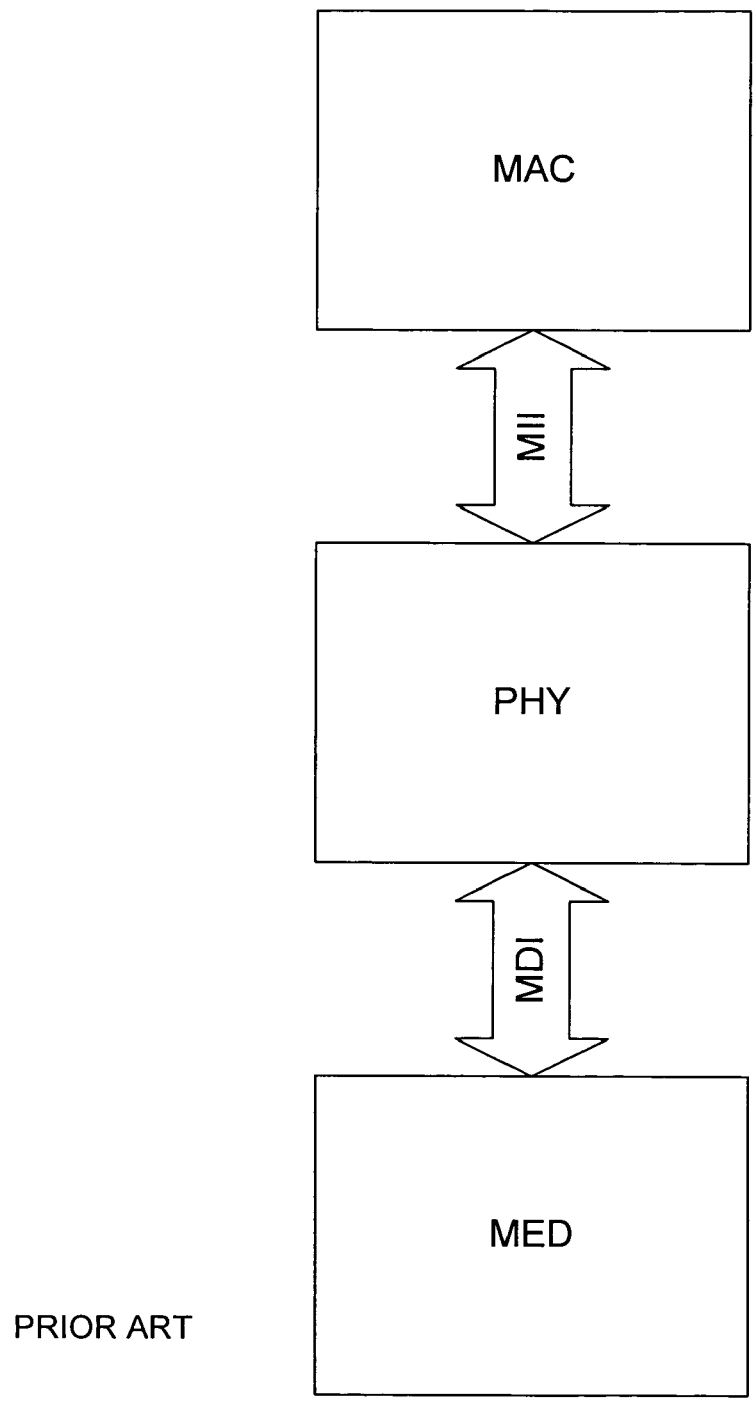
FIG. 1 is a block diagram depicting the layered model of Ethernet.

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

As described above, there are currently four techniques utilized for MAC-PHY rate matching:

collision back off
pause frames
carrier sense deferral
traffic shaping.

Each of these techniques has disadvantages which are obviated by the present invention. Some of these disadvantages will be briefly described.

Turning first to collision back off, the first problem is that the MAC will allow only 16 collisions before dropping the frame it is trying to send. This limits the rates that may be adapted and introduces possible packet loss. Second, while the PHY may be capable of receiving and transmitting frames at the same time, using collision back off forces the MAC and PHY to either only transmit or receive one frame at a time. Third, the number of collisions is usually used as a troubleshooting metric to diagnose the state of the network and the collision method of rate matching creates an abnormally high number of collisions which may confuse network operators or management software.

Carrier sense deferral is similar to the collision rate matching method with one major advantage. Using carrier sense deferral allows the MAC and PHY to transmit and receive at the same time. As with collisions, the MAC keeps track of "excessive deferrals", so that an error counter that will be unnaturally triggered by this method.

Thus, both collision back off and carrier sense deferral have made network management more difficult. As described above, to detect collisions the PHY must monitor its own transmission and thus cannot transmit and receive at the same time. Thus, the carrier sense deferral method has the advantage of allowing simultaneous transmission and reception.

The Pause frames technique, unfortunately, comes with several drawbacks. First, it is a network layer violation for a PHY to generate a pause frame. A network that uses pause frames may be disrupted by the addition of a PHY that uses them for rate matching. Second, the MAC's processing time for a pause frame is somewhat undefined. Because of this, it is harder to build a PHY that can rely on the MAC to stop transmitting before the PHY buffers overflow. Lastly, the use of pause frames is an option only in IEEE802.3 and not all MACs implement this feature.

Traffic shaping has the advantageous feature of being completely contained in the MAC. A PHY needs only a frame buffer to work with this method. Unfortunately, traffic shaping is an open loop system. The rate that the traffic is shaped to must be calculated in advance of transmission. This calculation must be repeated for any payload rate that the PHY might use. If the PHY's rate drifts below the rate that the MAC expects, buffer overflows and packet loss will occur. Similarly, if the PHY's rate drifts above the MAC's, the system will be wasting link bandwidth.

An embodiment of the present invention will now be described that eliminates the disadvantages of the existing MAC-PHY rate matching techniques. A block diagram of this embodiment is depicted in FIG. 2.

Figure 2:
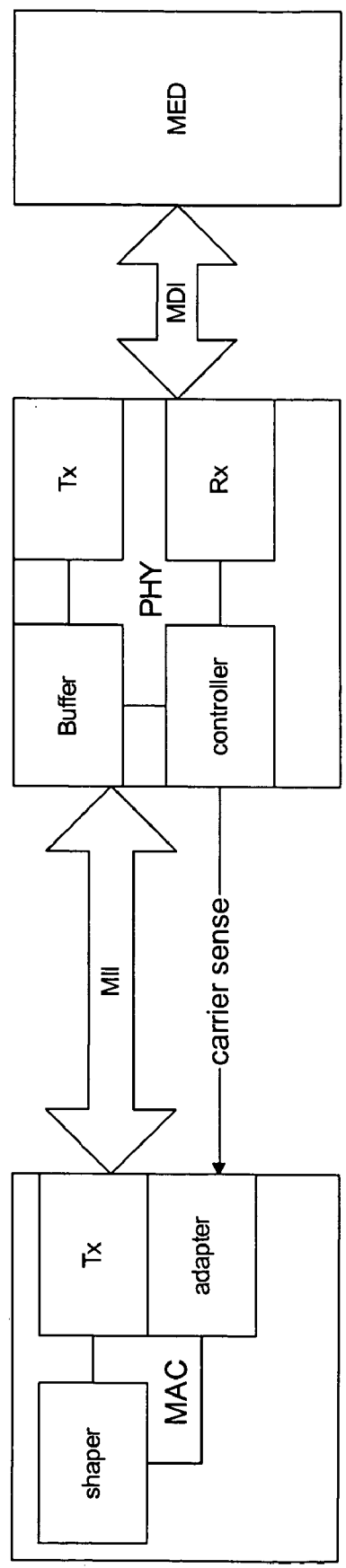
FIG. 2 is a block diagram of an embodiment of the invention.

Referring to FIG. 2, a MAC is connected to a PHY by a media independent interface (MII) and the PHY is connected to the medium, e.g., a cable, by a media dependent interface (MDI). The PHY includes a transmitter (Tx), receiver (Rx), a Tx buffer and a controller. The controller is coupled to both the Rx and the buffer. An output of the PHY controller is coupled to a carrier sense signal line. Thus, the PHY implements carrier sense deferral.

Figure 3:
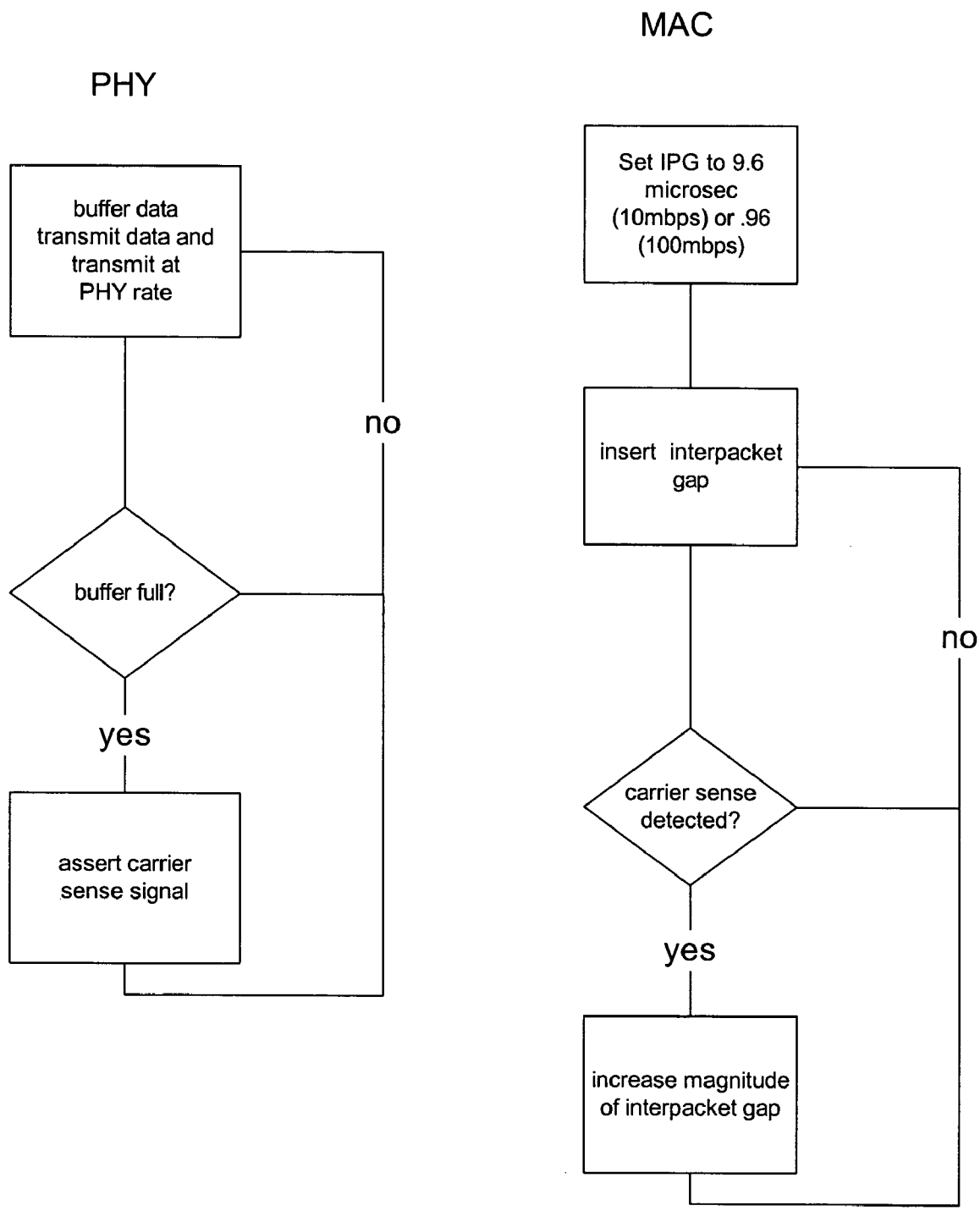
FIG. 3 is a flow chart depicting steps implemented by an embodiment of the invention.

The MAC is capable of implementing traffic shaping and includes a shaper, a transmitter coupled to the MII, and a rate adaptor. The rate adaptor has an input coupled to the carrier sense signal line and an output coupled to the shaper. The shaper has an output coupled to the transmitter The operation of the embodiment depicted in FIG. 2 will now be described with reference to the flow chart of FIG. 3.

This embodiment starts with a PHY that implements carrier sense deferral and a MAC that is capable of traffic shaping. At start up, the MAC operates at full speed (10 or 100 mbps) and the PHY throttles the MAC by asserting carrier sense. In a typical prior art "carrier sense deferral" rate matching method, this process would continue unabated and the MAC would be registering excessive deferrals.

Instead, the presently described embodiment contains a traffic shaper (as described above) and an "adaptor" entity that watches for carrier sense deferrals and adjusts the traffic shaper's target rate. This adaptor can be implemented in software or in hardware, external to or as part of the MAC itself. The adaptor decreases the target rate incrementally upon each deferral until deferrals are no longer occurring.

It is assumed that the PHY transmit rate is less than the MAC transmit rate, e.g., the PHY transmit rate is 15 mbps and the MAC transmit rate is 100 mbps. The PHY will buffer data received from the MAC because the data is being received faster than it is being transmitted. If the MAC continues to transmit data the buffer will eventually overflow. At this point the MAC is inserting the standard Ethernet inter-packet gap (IPG) of 0.96 microseconds.

The controller on the PHY will detect when the transmit buffer has reached an overflow condition and assert a carrier sense signal which is detected by the MAC adaptor entity. The MAC rate adaptor responds to the assertion of the carrier sense signal causing the traffic shaper to increase the magnitude of the IPG by a fixed magnitude to decrease the target rate. The MAC continues to transmit frame data at 100 mbps but the average rate at which data arrives at the buffer is decreased because the IPG is increased. This decrease of the MAC's average data transmit rate also reduces the rate that data accumulates in the buffer because the PHY continues to transmit during the IPGs.

The PHY continues to assert carrier sense signals until the rate at which data is received at the PHY matches the rate at which data is transmitted by the PHY. The buffer allows temporary mismatch of these rates to occur without further carrier sense deferrals being asserted.

In another embodiment, the adaptor periodically increases the shaper's target rate incrementally to "test" the PHY's rate. If the PHY's payload rate has increased, the adaptor increases the target rate until deferral begins to occur again, and then decreases the rate to the point that the rates are again matched. The frequency of this test may be pre-configured in the adaptor or may be manually initiated by a management entity.

If the PHY's rate decreases, deferrals will start to occur again. The adaptor then continues to decrease the target rate until deferrals cease.

The adaptor may be configured with a minimum and maximum rate that it may set on the shaper.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:
    detecting, at a medium access controller (MAC), a carrier sense signal asserted by a physical layer device (PHY) when an overflow condition of a transmit buffer on the PHY occurs indicating that data is being transmitted from the MAC to the PHY at a faster rate than the data is being transmitted by the PHY;
    increasing an inter-packet gap when a carrier sense signal is detected to decrease the MAC data transfer rate until the PHY and the MAC transmit data at the same rate; and
    periodically decreasing the inter-packet gap to increase the MAC data transfer rate until the PHY again asserts the carrier sense signal to provide closed-loop control of the magnitude of the inter-packet gap.

2. The method of claim 1 further comprising:
    initializing the inter-packet gap to 9.6 microseconds.

3. An apparatus comprising:
    a medium access controller (MAC), with the MAC including a traffic shaper configured to vary a MAC data transfer rate by adjusting an inter-packet gap, and further including an adaptor configured to respond to a carrier sense signal asserted by a physical layer device (PHY) to control the traffic shaper to increase the inter-packet gap to reduce the MAC data transfer rate, with the adaptor configured to periodically decrease the inter-packet gap to increase the MAC data transfer rate until the PHY again asserts the carrier sense signal to provide closed-loop control of the magnitude of the inter-packet gap; and
    with the PHY including a transmit buffer configured to hold frames to be transmitted and a controller coupled to the transmit buffer configured to assert a carrier sense signal when the transmit buffer holds a selected number of frames.

4. The apparatus of claim 3 with the adaptor configured to initialize the inter-packet gap to 9.6 microseconds.

5. An apparatus comprising:
    means for detecting, at a medium access controller (MAC), a carrier sense signal asserted by a physical layer device (PHY) when an overflow condition of a transmit buffer on the PHY occurs indicating that data is being transmitted from the MAC to the PHY at a faster rate than the data is being transmitted by the PHY;
    means for increasing an inter-packet gap when a carrier sense signal is detected to decrease the MAC data transfer rate until the PHY and the MAC transmit data at the same rate; and
    means for periodically decreasing the inter-packet gap to increase the MAC data transfer rate until the PHY again asserts the carrier sense signal to provide closed-loop control of the magnitude of the inter-packet gap.

6. The apparatus of claim 5 further comprising:
    means for initializing the inter-packet gap to 9.6 microseconds.

* * * * *